United States Patent [19]
Wells, Sr.

[11] 4,241,426
[45] Dec. 23, 1980

[54] FALSE PHASE FRONT ACOUSTIC DECOY

[75] Inventor: William E. Wells, Sr., Panama City, Fla.

[73] Assignee: The United States of America as represented by the Secretary of the Navy, Washington, D.C.

[21] Appl. No.: 344,508

[22] Filed: Feb. 12, 1964

[51] Int. Cl.³ .............................................. H04K 3/00
[52] U.S. Cl. ....................................................... 367/1
[58] Field of Search ................... 340/3 A, 3 T, 5, 5 D; 343/100.6, 18, 18 E; 367/1

[56] References Cited

U.S. PATENT DOCUMENTS

| | | | |
|---|---|---|---|
| 2,397,107 | 3/1946 | Hammond, Jr. | 367/1 |
| 3,008,142 | 11/1961 | Saltzman et al. | 343/777 |
| 3,016,513 | 1/1962 | Van Dyke | 367/102 |
| 3,016,514 | 1/1962 | Ilgenfritz et al. | 367/115 |
| 3,891,961 | 6/1975 | Haisfield | 367/1 |

*Primary Examiner*—Richard A. Farley
*Attorney, Agent, or Firm*—Louis A. Miller; Rolla N. Carter; Don D. Doty

EXEMPLARY CLAIM

1. An acoustical decoy system for protecting a marine carrier vessel from an attcking torpedo, comprising in combination:
   a marine carrier vessel to be protected, having a longitudinal axis substantially paralleling the direction of travel thereof;
   an electrical signal generator disposed in said marine carrier vessel;
   a phase shifter disposed in said marine carrier vessel and electrically connected to the output of said electrical signal generator;
   a first electroacoustical transducer disposed remotely from said marine carrier vessel on substantially an extension of the longitudinal axis thereof;
   a first cable containing electrical conductors effectively interconnecting the output of said phase shifter and the input of said first electroacoustical transducer;
   a second electroacoustical transducer disposed more remotely from said marine carrier vessel than the aforesaid first electroacoustical transducer and likewise on substantially an extension of the longitudinal axis of said marine carrier vessel; and
   a second cable containing electrical conductors effectively interconnecting the output of said electrical signal generator and the input of the aforesaid second electroacoustical transducer.

3 Claims, 3 Drawing Figures

FALSE PHASE FRONT ACOUSTIC DECOY

The invention described herein may be manufactured and used by or for the Government of the United States of America for governmental purposes without the payment of any royalties thereon or therefor.

The present invention relates generally to decoys and in particular is an acoustic submarine decoy that broadcasts a false-phase wave front to an enemy guided torpedo so as to influence it to home thereon rather than on the actual intended target.

In the past, sound fields alone have been employed to influence passive guided torpedoes in an attempt to direct them away from and protect an actual target ship or submarine boat. With the advent of active, phase-sensitive guided torpedoes and other missiles, the need for a more sophisticated and effective method and means for the decoy thereof has arisen.

The present invention is an improvement over the prior art because it minimizes and, as a matter of fact, substantially overcomes most of the disadvantages thereof for many practical purposes.

It is, therefore, an object of this invention to provide an improved method and means for decoying an enemy guided torpedo from a target to be protected.

Another object of this invention is to provide an improved method and means for confusing enemy sonar apparatus for the purpose of protecting certain surface and submarine vessels.

Still another object of this invention is to "jam" the acoustical panel of homing torpedoes and other guided missiles.

A further object of this invention is to provide an improved method and means of giving a false position appearance of a given target to echo-search and passive homing apparatus.

Another object of this invention is to provide a method and means for generating a wave front from a pair of wave fronts having a different phase relationship.

Another object of this invention is to provide an active displaced phase front decoy.

Other objects and many of the attendant advantages will be readily appreciated as the subject invention becomes better understood by reference to the following detailed description when considered in conjunction with the accompanying drawing wherein.

Figure 1:
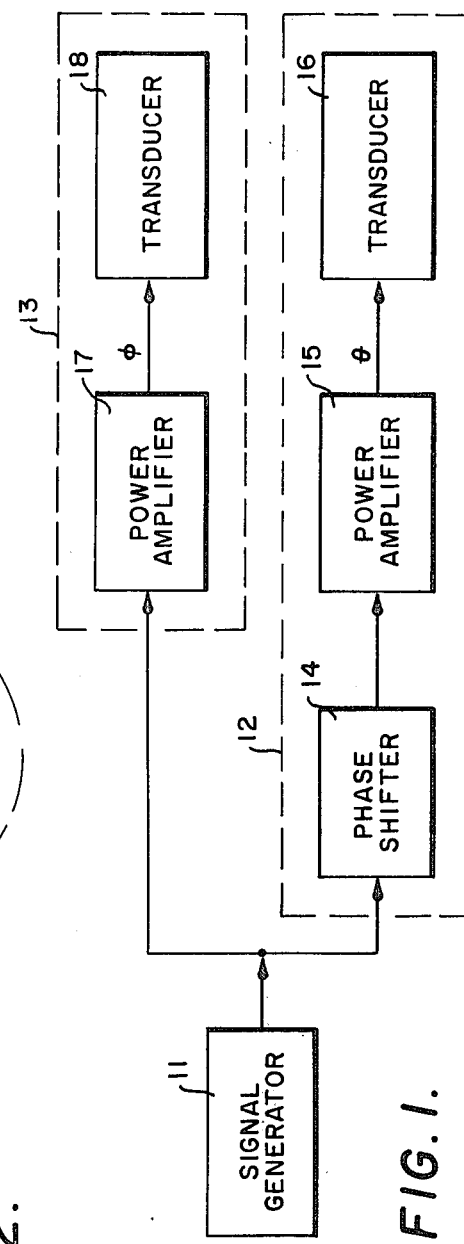
FIG. 1 is a block diagram of the electrical system incorporated in the subject invention.

Referring now to FIG. 1, there is shown a signal generator 11 which may be used to produce an electrical output signal having any preferred waveform. Thus, it may, for instance, be a simple sine wave electronic oscillator type generator, a frequency modulation (FM) signal generator, a pseudo-random noise generator, or any other predetermined waveform signal generator. The output from said signal generator 11 is simultaneously supplied to a pair of channels 12 and 13 for signal processing therein, respectively.

Channel 12 includes a phase shifter 14 which actually is the component that receives the aforesaid signal generator output signal. This phase shifter may be any of the well known and conventional phase shifter or delay line means and may be adjustable to vary the phase of the signal shifted or delayed therein, if so desired. The output ($\theta$) therefrom is fed to the input of an appropriate power amplifier 15, the output of which is supplied to a transducer 16. In the preferred embodiment herein disclosed, transducer 16 is an omnidirectional electro-acoustical transducer which converts electrical energy into proportional acoustical energy that is broadcast throughout a predetermined subaqueous medium, such as sea water or the like. However, it should be understood that any desired transducer may be employed as necessary to meet the conditions of any given operational procedures. This, of course, is true because so doing would merely be a matter of design choice, the making of which would be well within the purview of one skilled in the art having the benefit of the teachings persented herewith.

As mentioned previously, the output of signal generator 11 is also applied to another signal processing channel 13, and in this particular embodiment, is acutally supplied directly to a power amplifier 17 contained therein. The output signal ($\phi$) is then supplied to another omnidirectional electro-acoustical transducer 18 which is substantially identical to the aforementioned transducer 16 for any predetermined operational circumstances. Here, again, it should be understood that any other appropriate type of transducer may be employed that will broadcast preferred energy throughout a given environment. Of course, for optimum operation of the invention, transducers 16 and 18 should be similar in type. Hence, if the operational environment is water, the presently disclosed transducers may be employed; but if, for example, the operational environment were space, radio or radar antennas or the like may be included in the preferred embodiment of the invention.

Figure 2:
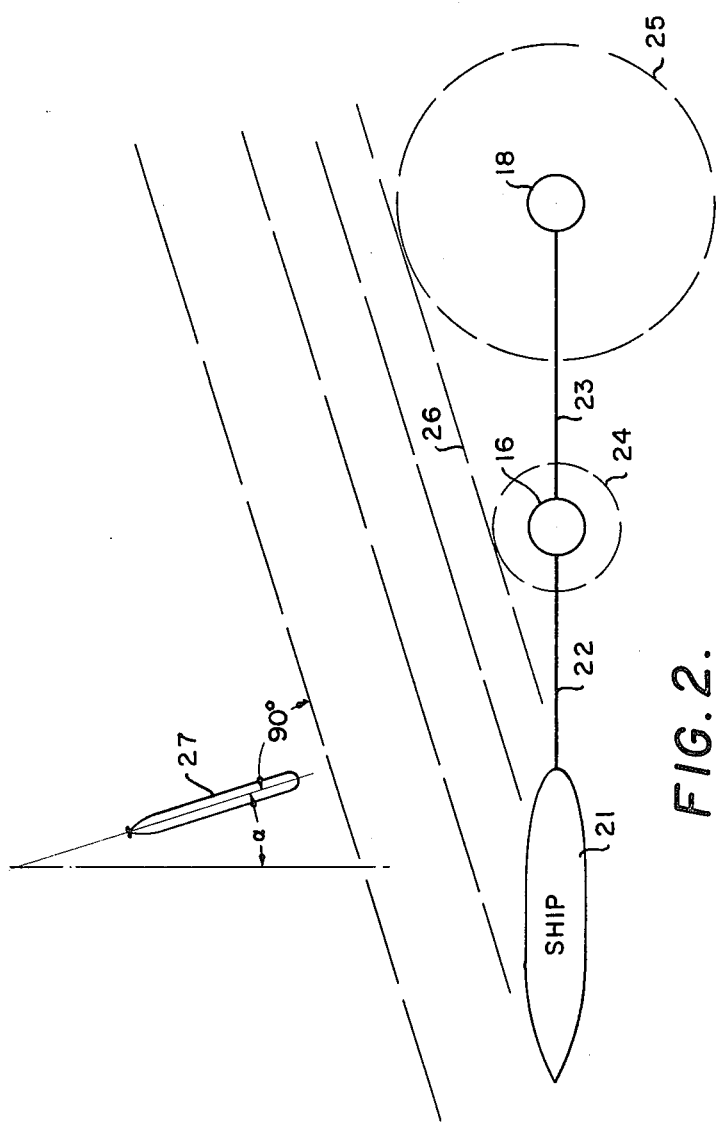
FIG. 2 is an exemplary pictorial representation of the operation of the invention.

FIG. 2 depicts a typical system arrangement incorporating this invention and is shown as including a ship 21 which is pulling or towing the aforesaid transducers 16 and 18 by means of cables 22 and 23. Although in this case ship 21 is illustrated as being a surface vessel, it should be understood that it may also be a submarine boat or perhaps even a space vehicle, depending on the intended operational conditions. Furthermore, the aforesaid cables 22 and 23 are intended to be electrical cables and may, in fact, be coaxial cables, but it should also be understood that they may include such other cable structures as are necessary to provide the proper strength or other desired characteristics.

In FIG. 2, waveforms of the signals respectively broadcast from transducer 16 and 18 are shown as having substantially circular wavefronts 24 and 25 which, at least in part, algebraically add in the environmental medium—in this case, sea water—to become a predetermined directional wavefront 26 that travels toward a guided torpedo 27 or other guided missile to be influenced and decoyed from homing on ship 21. It should be understood, however, that the inventive concept is not intended to be limited to the use of just two transducers. If so desired, any number thereof may be employed that will provide any degree of refinement of the resultant false wavefront to be propagated to said guided torpedo. Of course, as would be obvious to the artisan, any additional transducers would necessitate the addition of a like number of appropriate phase shifters and conductor cables, to be respectively associated therewith. The physical disposition of said additional transducers, if any, may be such as to place them in an in-line or other arrangement that will produce preferred false wavefront patterns to propagated throughout the environmental medium.

Figure 3:
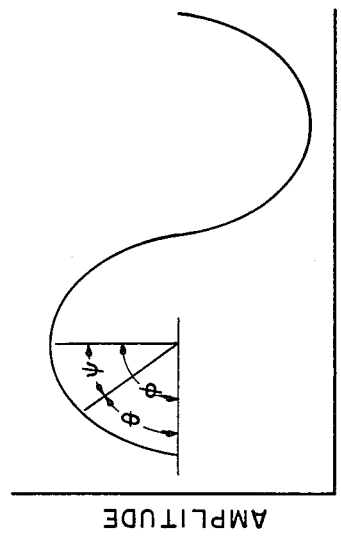
FIG. 3 is a simple sine wave representation, showing exemplary relative phase relationships between the signals that may be generated and used in the subject invention.

Referring now to FIG. 3, there is shown a simple single cycle sine waveform which is presented merely to illustrate the relative relationships of the various input and output signals. The respective phase angles are likewise named and illustrated in order to simplify discussion of the operation of the subject invention to be presented subsequently. At this time, however, as suggested above, it should be understood that the signal initially generated by signal generator 11 may incorporate any desired, predetermined waveform, or any variety or combination of waveforms, or any other waveforms, including either amplitude modulation, frequency modulation, or both.

Briefly, the operation of the instant invention is presented as follows:

Signal generator 11 produces an output signal that is desirable and pertinent for any operational or environmental circumstances, and this signal is phase shifted by an amount or by an angle which will ultimately provide an optimum angular wave front to an enemy homing torpedo, such as that represented by torpedo 27 in FIG. 2. After phase shifting, the resulting signal is power amplified to a useful level and then supplied to transducer 16 for broadcast throughout the ambient environment which, in this case, is sea water.

Simultaneously with the application of the output from signal generator 11 to phase shifter 14, said output signal therefrom is power amplified to a useful lever by amplifier 17 and fed to transducer 18, likewise for broadcast thereof throughout the ambient sea water environment. Of course, as may readily be seen, the signal processing in channel 13, unlike that of channel 12, occurs without the benefit of phase shifting. Hence, it also may be seen that the actual broadcast signals may be represented as having phase angles $\phi$ and $\theta$, respectively and thus their difference may be defined as angle $\psi$.

If the power outputs of amplifiers 15 and 17 are equal as they should be, and if the device of FIG. 1 is disposed in the arrangement shown in FIG. 2, then, considering a single cycle as shown in FIG. 3, the output of transducer 18 is at angle $\phi$ when the output of transducer 16 is at angle $\theta$, with an angular difference $\psi$ therebetween. These outputs then combine to form wavefront 26 which, in turn, applies a resultant pressure across the torpedo's transducer face, because they are at the same repetition rate but have a slight displacement in phase. Thus, in effect, the torpedo will actually respond to the resultant pressure wavefront instead of to either of the individual components thereof. Then, in an attempt to acquire a zero degree phase differential across its transducer face, the guidance system thereof will try to orient the longitudinal axis of the torpedo perpendicular to the resultant phase front of the decoy signals, thereby directing it away from the ship or other target to be protected and, in most instances, away from the subject decoy transducers as well.

In other words, as far as the torpedo's guidance system is concerned, when a zero degree phase differential is acquired, the target is dead ahead. But, with the existance of a false wave front, when the torpedo acquires a zero degree phase differential, an error equal to angle $\alpha$ is introduced into the guidance system thereof. This causes the torpedo to pass aft of the towing vessel 21 and, in all probability, on any subsequent re-attacks, it will again assume a heading perpendicular to the false phase front and thus remain in the vicinity of the decoy, although it will not necessarily ever come into actual contact therewith. The decoy, therefore, will probably be safe from destruction by the torpedo, as will be the ship.

Although only shown schematically in FIG. 2, the entire device of FIG. 1 with the exception of the transducers and cables may be contained in ship 21. Or, in the alternative, the electronics package consisting of signal generator 11, phase shifter 14, and power amplifiers 15 and 17 may be housed in any suitable container located at either transducer 16 or 18. Moreover, it should be understood that the embodiment of FIG. 2 is only exemplary and that, if desired, transducers 16 and 18 and their respective channels may be interchanged and, consequently their wavefronts would be reversed, resulting in a different resultant wavefront being supplied to the enemy torpedo. In addition, instead of being towed, the subject decoy may be pushed or hull mounted, but in any event, it is preferable that angle $\psi$ be kept constant over the entire operating frequency range, in order to maintain a desired angle $\alpha$ for positive torpedo control and target protection.

If warranted by operational circumstances, the subject decoy, instead of transmitting continuously, may be pulsed, or even may listen for a "ping" from an active homing torpedo or an active shipboard or submarine boat sonar, amplify it, and retransmit it with a displaced phase front. The changes necessary to effect such performance would be obvious to the artisan, inasmuch as only well known sonar systems or other comparable systems need be substituted for signal generator 11.

The optimum spacing between the transducers themselves and the transducers and the vessel to be protected will vary depending on the operational circumstances involved. However, in the subject preferred embodiment, it has been found that a distance of approximately two hundred feet between the transducers is effective and a distance of between four hundred and six hundred feet between the ship and the nearest transducer is likewise effective and satisfactory for many practical purposes.

As a general rule, it is preferable to tow the broadcasting transducers behind the ship (or other possible friendly target) to be protected because the movement of the ship places it in even a more remote position with respect to the generated false wavefront and the torpedo or missile to be decoyed. Hence, such ship movement makes it considerably more difficult for the torpedo, when additionally influenced by the false wave front, to home thereon. Consequently, the extent of ship protection provided by both ship movement and the false wave front, resulting from the moving sound sources being towed therefrom, certainly is increased considerably.

Although the presently disclosed preferred arrangement appears at this time to be the most effective, as suggested previously, it would obviously be possible to provide some protection improvement for a ship by reversing the procedure and having the ship effectively push the decoy transducers ahead of it at some predetermined optimum distance. This, combined with an appropriate transducer and signal phase shifting arrangement, would also improve the safety of the ship and reduce its vulnerability to torpedo attack. Accordingly, the disclosed embodiment of this invention should be considered as preferable; but, in view of the teachings herein presented, the invention is not intended to be limited thereto, since selecting the optimum arrangement for any given oeprational circumstances would be well within the purview of one skilled in the art having the benefit of said teachings.

Obviously many modifications and other embodiments of the subject invention will readily come to the mind of one skilled in the art having the benefit of the teachings presented in the foregoing description in accompaniment with the associated drawings. Therefore, it is to be understood that the invention is not to be limited thereto and that said modification and embodiments are intended to be included within the scope of the appended claims.

I claim:

1. An acoustical decoy system for protecting a marine carrier vessel from an attacking torpedo, comprising in combination:
   a marine carrier vessel to be protected, having a longitudinal axis substantially paralleling the direction of travel thereof;
   an electrical signal generator disposed in said marine carrier vessel;
   a phase shifter disposed in said marine carrier vessel and electrically connected to the output of said electrical signal generator;
   a first electroacoustical transducer disposed remotely from said marine carrier vessel on substantially an extension of the longitudinal axis thereof;
   a first cable containing electrical conductors effectively interconnecting the output of said phase shifter and the input of said first electroacoustical transducer;
   a second electroacoustical transducer disposed more remotely from said marine carrier vessel than the aforesaid first electroacoustical transducer and likewise on substantially an extension of the longitudinal axis of said marine carrier vessel; and
   a second cable containing electrical conductors effectively interconnecting the output of said electrical signal generator and the input of the aforesaid second electroacoustical transducer.

2. A method of decoying an attacking acoustical homing torpedo away from a marine carrier vessel to be protected, comprising the steps of:
   generating an electrical signal having predetermined characteristics;
   shifting the phase of said generated electrical signal;
   amplifying said phase-shifted electrical signal to a predetermined power level;
   converting said amplified, phase-shifted electrical signal into a first acoustical signal proportional thereto;
   broadcasting said first acoustical signal throughout the environmental medium of said torpedo at a location that is remote from said marine carrier vessel to be protected and disposed substantially along an extension of the longitudinal axis thereof;
   amplifying the aforesaid generated electrical signal by such an amount as to make the power level thereof substantially equal to the predetermined power level of said amplified, phase-shifted electrical signal;
   converting said amplified electrical signal into a second acoustical signal proportional thereto; and
   broadcasting said second acoustical signal throughout the environmental medium of said torpedo at the same time the aforesaid first acoustical signal is broadcast, at a location that is more remote from said marine carrier vessel to be protected than the broadcast location of the aforesaid first acoustical signal, and disposed substantially along an extension of the longitudinal axis of said marine carrier vessel.

3. The method of claim 2 further characterized by the step of moving the respective locations where said first and second acoustical signals are being broadcast at the time they are being broadcast.

* * * * *